United States Patent
Sigamani

(10) Patent No.: US 11,146,176 B2
(45) Date of Patent: Oct. 12, 2021

(54) SWITCH-MODE POWER SUPPLIES INCLUDING THREE-LEVEL LLC CIRCUITS

(71) Applicant: Astec International Limited, Kowloon (HK)

(72) Inventor: James Sigamani, Pasig (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 16/805,147

(22) Filed: Feb. 28, 2020

(65) Prior Publication Data

US 2021/0273567 A1    Sep. 2, 2021

(51) Int. Cl.
  *H02M 3/335* (2006.01)
  *H02M 3/338* (2006.01)
  *H02M 1/10* (2006.01)
  *H02M 1/00* (2006.01)

(52) U.S. Cl.
  CPC ......... *H02M 3/33569* (2013.01); *H02M 1/10* (2013.01); *H02M 3/3385* (2013.01); *H02M 3/33523* (2013.01); *H02M 1/0058* (2021.05)

(58) Field of Classification Search
  CPC .. H02M 3/33569; H02M 3/3385; H02M 1/10; H02M 2001/0058; H02M 3/335; H02M 3/01; H02M 3/33523; H02M 3/33507; H02M 3/353; H02M 1/0058
  See application file for complete search history.

(56) References Cited

U.S. PATENT DOCUMENTS

| 5,877,951 | A *  | 3/1999  | Mweene ............... H02M 3/337 363/98 |
| 9,077,255 | B2 * | 7/2015  | Fu ........................ H02M 3/3376 |
| 10,069,397 | B2 * | 9/2018  | Vaidya ................ H02M 3/1588 |
| 10,181,732 | B2 * | 1/2019  | Eckert ..................... H02J 7/345 |
| 2009/0303753 | A1 * | 12/2009 | Fu ..................... H02M 3/33592 363/20 |
| 2014/0218973 | A1 * | 8/2014  | Popovici ........... H02M 3/33569 363/17 |
| 2020/0366211 | A1 * | 11/2020 | Zhang ................... H02M 1/083 |

* cited by examiner

*Primary Examiner* — Gary L Laxton

(57) ABSTRACT

A switch-mode power supply includes a pair of input terminals, a pair of output terminals, and at least four switches coupled in a three-level LLC circuit arrangement between the pair of input terminals and the pair of output terminals. First and second ones of the at least four switches define a first half-bridge and third and fourth ones of the at least four switches define a second half-bridge. The power supply also includes a fifth switch coupled across the second switch and the third switch to short circuit the second switch and the third switch when the fifth switch is closed, and a control circuit. The control circuit includes a voltage-controlled oscillator (VCO) and multiple logic gates and flip-flops coupled to operate the at least four switches with zero-voltage switching (ZVS).

20 Claims, 15 Drawing Sheets

SWITCH-MODE POWER SUPPLIES INCLUDING THREE-LEVEL LLC CIRCUITS

FIELD

The present disclosure relates to switch-mode power supplies including three-level LLC circuits.

BACKGROUND

This section provides background information related to the present disclosure which is not necessarily prior art.

Switch-mode power supplies with three phase inputs may use a Vienna rectifier topology for an efficient front-end power factor correction (PFC) circuit, but the output voltage of the PFC may be around 800 Volts, which may make the design of the downstream DC-DC converter difficult. A conventional high efficiency half-bridge or full-bridge LLC converter typically requires a 1200 V rated device for switching, but 1200 V rated Si devices may not be very efficient at medium and high switching frequencies. A three-level LLC topology may be used with 600-650 V rated devices, using asymmetrical control to achieve a high step-down ratio with a relatively lower transformer primary to secondary transformer ratio.

FIG. 1 illustrates an example power supply 100 including a three-level LLC topology. The power supply 100 receives a voltage input of 800 V from an input power source 800. The switches Q2 and Q3 define a first half-bridge coupled with the capacitor C6, and the switches Q1 and Q4 define a second half-bridge coupled with the capacitor C7. The switch Q2 is driven by a control signal AA via an isolated driver E9 and the resistors R34 and R38, the switch Q3 is driven by a control signal BB2 via an isolated driver E8 and the resistors R27 and R28, the switch Q4 is driven by a control signal AA2 via an isolated driver E10 and the resistors R35 and R37, and the switch Q1 is driven by a control signal BB via an isolated driver E7 and the resistors R29 and R32.

The power supply also includes a transformer TX1 including a primary winding P1 and a secondary winding S1. The capacitor C1 and the inductor L5 are coupled between the primary winding P1 and the switches Q2 and Q3, and the capacitor C2 and the inductor L1 are coupled between the primary winding P1 and the switches Q1 and Q4. The power supply 100 further includes four diodes D1, D2, D9 and D10 coupled to the secondary winding S1, and a capacitor C10 and load RLOAD coupled to the output Vout.

FIG. 2 illustrates example current waveforms through the switches Q1, Q2, Q3 and Q4 during operation of the power supply 100. As shown in FIG. 1, the RMS current through the switches Q3 and Q4 are higher (e.g., about 1.732 times higher) than the RMS current through the switches Q1 and Q2. Therefore, the switches Q1 and Q2 require a lower Rdson. Also, the switches Q3 and Q4 are turned on at the same time so power losses through the switches Q3 and Q4 are higher because the Rdson of the switches Q3 and Q4 are connected in series.

SUMMARY

This section provides a general summary of the disclosure, and is not a comprehensive disclosure of its full scope or all of its features.

According to one aspect of the present disclosure, a switch-mode power supply includes a pair of input terminals for receiving an alternating current (AC) or direct current (DC) voltage input from an input power source, a pair of output terminals for supplying a direct current (DC) voltage output to a load, and at least four switches coupled in a three-level LLC circuit arrangement between the pair of input terminals and the pair of output terminals. First and second ones of the at least four switches define a first half-bridge and third and fourth ones of the at least four switches define a second half-bridge. The power supply also includes a fifth switch coupled across the second switch and the third switch to short circuit the second switch and the third switch when the fifth switch is closed, and a control circuit. The control circuit includes a voltage-controlled oscillator (VCO) and multiple logic gates and flip-flops coupled to operate the at least four switches with zero-voltage switching (ZVS).

According to another aspect of the present disclosure, a switch-mode power supply includes a pair of input terminals for receiving an alternating current (AC) or direct current (DC) voltage input from an input power source, a pair of output terminals for supplying a direct current (DC) voltage output to a load, a circuit ground, and at least four switches coupled in a three-level LLC circuit arrangement between the pair of input terminals and the pair of output terminals. First and second ones of the at least four switches define a first half-bridge and third and fourth ones of the at least four switches define a second half-bridge. The first half-bridge is coupled between the circuit ground and a first one of the pair of input terminals, and the second half-bridge is coupled between the circuit ground and a second one of the pair of input terminals. The power supply also includes a fifth switch coupled across the second switch and the third switch to short circuit the second switch and the third switch when the fifth switch is closed.

According to yet another aspect of the present disclosure, a switch-mode power supply includes a pair of input terminals for receiving an alternating current (AC) or direct current (DC) voltage input from an input power source, a pair of output terminals for supplying a direct current (DC) voltage output to a load, a transformer having a primary side and a secondary side, and at least four switches coupled in a three-level LLC circuit arrangement between the pair of input terminals and the primary side of the transformer. First and second ones of the at least four switches define a first half-bridge and third and fourth ones of the at least four switches define a second half-bridge. The power supply also includes a control circuit. The control circuit includes a voltage-controlled oscillator (VCO) and multiple logic gates and flip-flops coupled to operate the at least four switches with zero-voltage switching (ZVS).

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
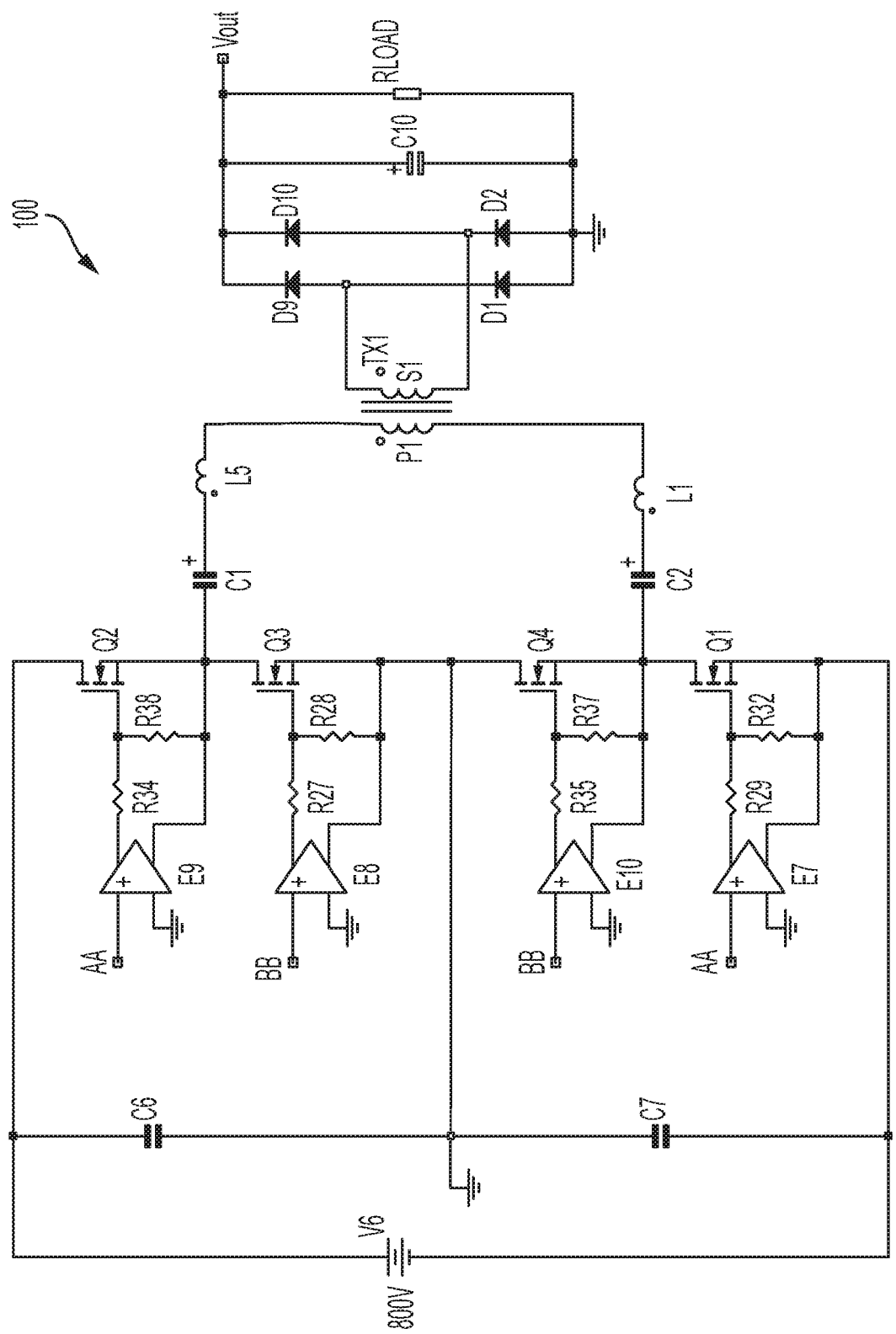
FIG. 1 is a circuit diagram of a power supply including a three-level LLC circuit, according to the prior art.
Figure 2:
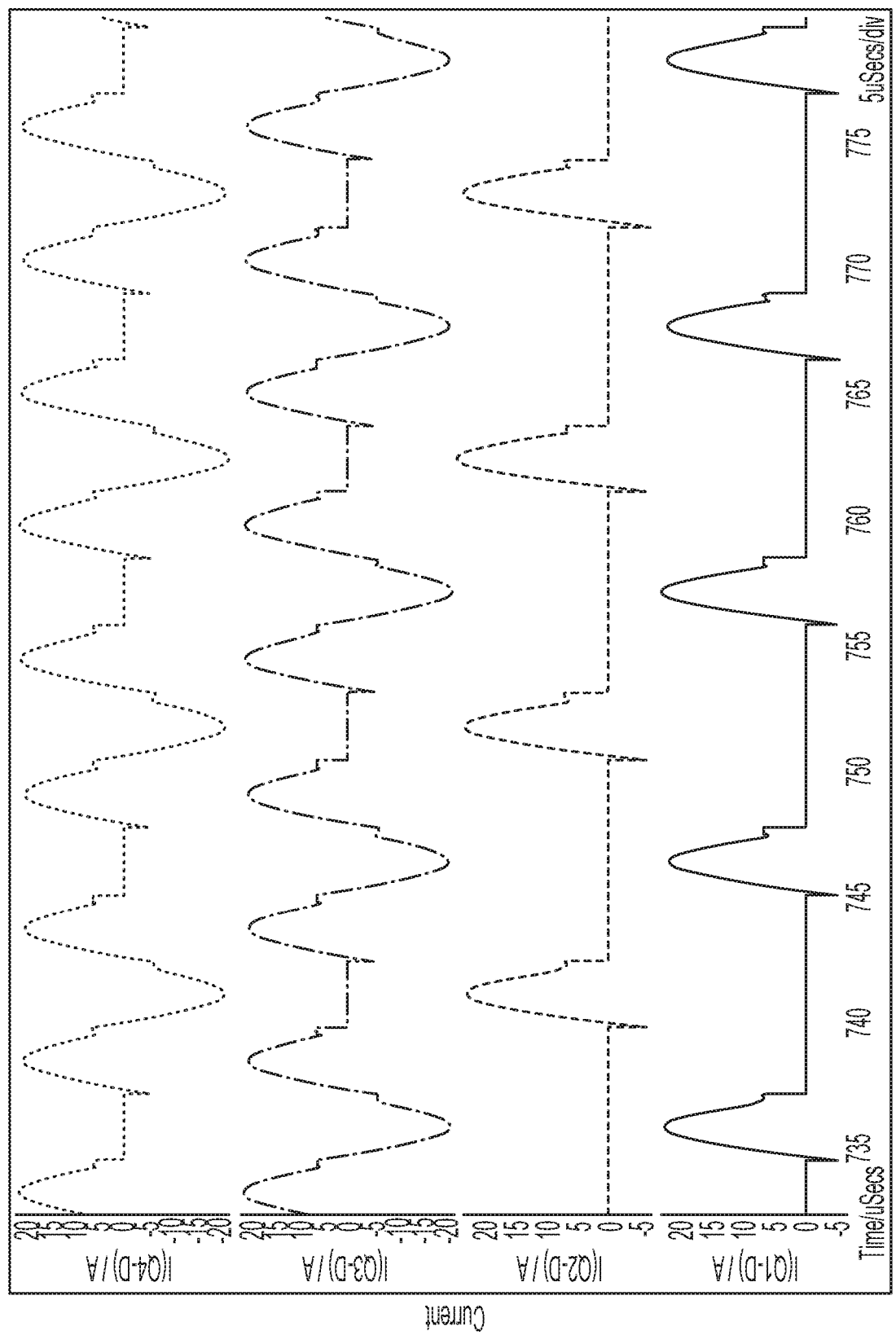
FIG. 2 is a graph of example current waveforms of the power supply of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
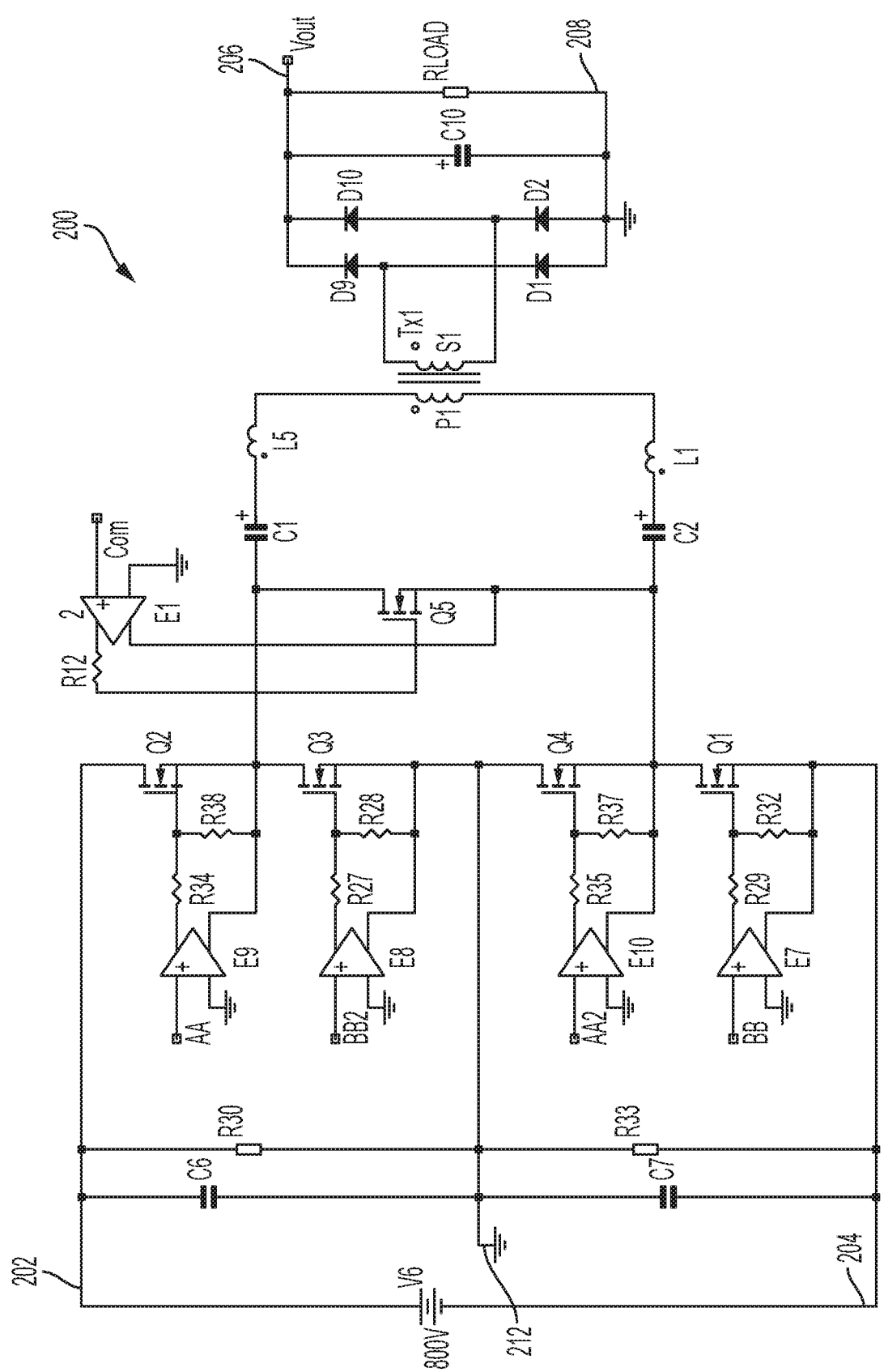
FIG. 3 is circuit diagram of a power supply including a three-level LLC circuit, according to one example embodiment of the present disclosure.

A switch-mode power supply according to one example embodiment of the present disclosure is illustrated in FIG. 3 and indicated generally by reference number 200. The power supply 200 includes a pair of input terminals 202 and 204 for receiving a direct current (DC) voltage input from an input power source V6, and a pair of output terminals 206 and 208 for supplying a direct current (DC) voltage output (Vout) to a load (RLOAD).

The power supply 200 also includes four switches Q1, Q2, Q3 and Q4 coupled in a three-level LLC circuit arrangement between the pair of input terminals 202, 204 and the pair of output terminals 206, 208. The switches Q2 and Q3 define a first half-bridge and the switches Q1 and Q4 define a second half-bridge.

Figure 4:
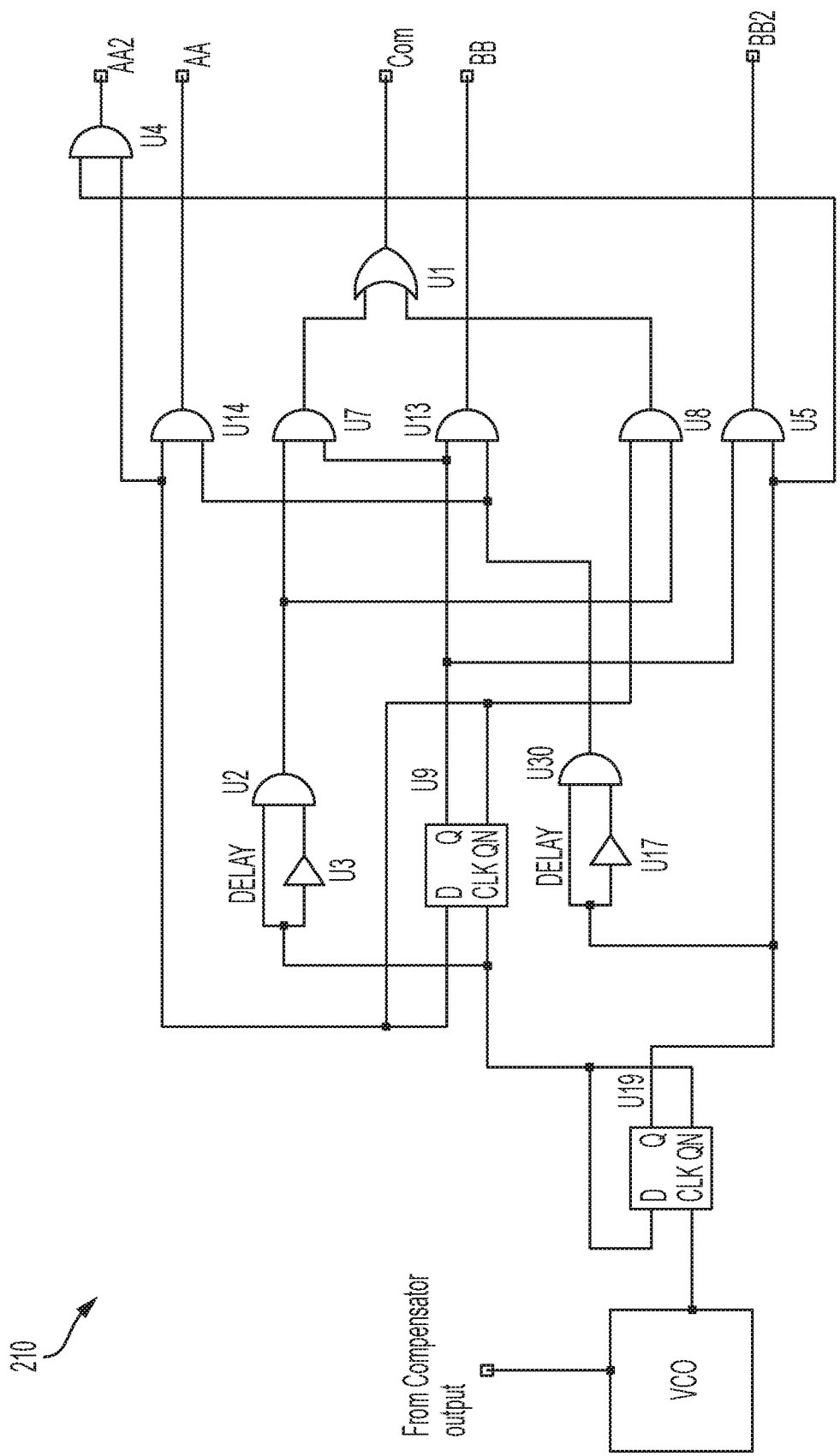
FIG. 4 is a circuit diagram of a control circuit of the power supply of FIG. 3.

The power supply 200 also includes a fifth switch Q5 coupled across the switches Q3 and Q4 to short circuit the switches Q3 and Q4 when the fifth switch Q5 is closed, and a control circuit 210 (illustrated in FIG. 4). The control circuit 210 includes a voltage-controlled oscillator (VCO), logic gates U1-U5, U7-U8, U13-U14, U17 and U30, and flip-flops U0 and U19, coupled to operate the switches Q1-Q4 with zero-voltage switching (ZVS).

Referring again to FIG. 3, the power supply 200 includes a transformer TX1 and four diodes D1, D2, D9 and D10. The transformer TX1 includes one or more primary windings P1, and one or more secondary windings S1. The switches Q1-Q4 are coupled with the primary winding(s) P1, and the diodes D1-D2 and D9-D10 are coupled with the secondary winding(s) S1.

Although FIG. 3 illustrates four diodes D1-D2 and D9-D10, other embodiments may include more or less diodes, diodes connected in different arrangements, secondary switches (e.g., synchronous rectification switches, etc.).

Figure 8:
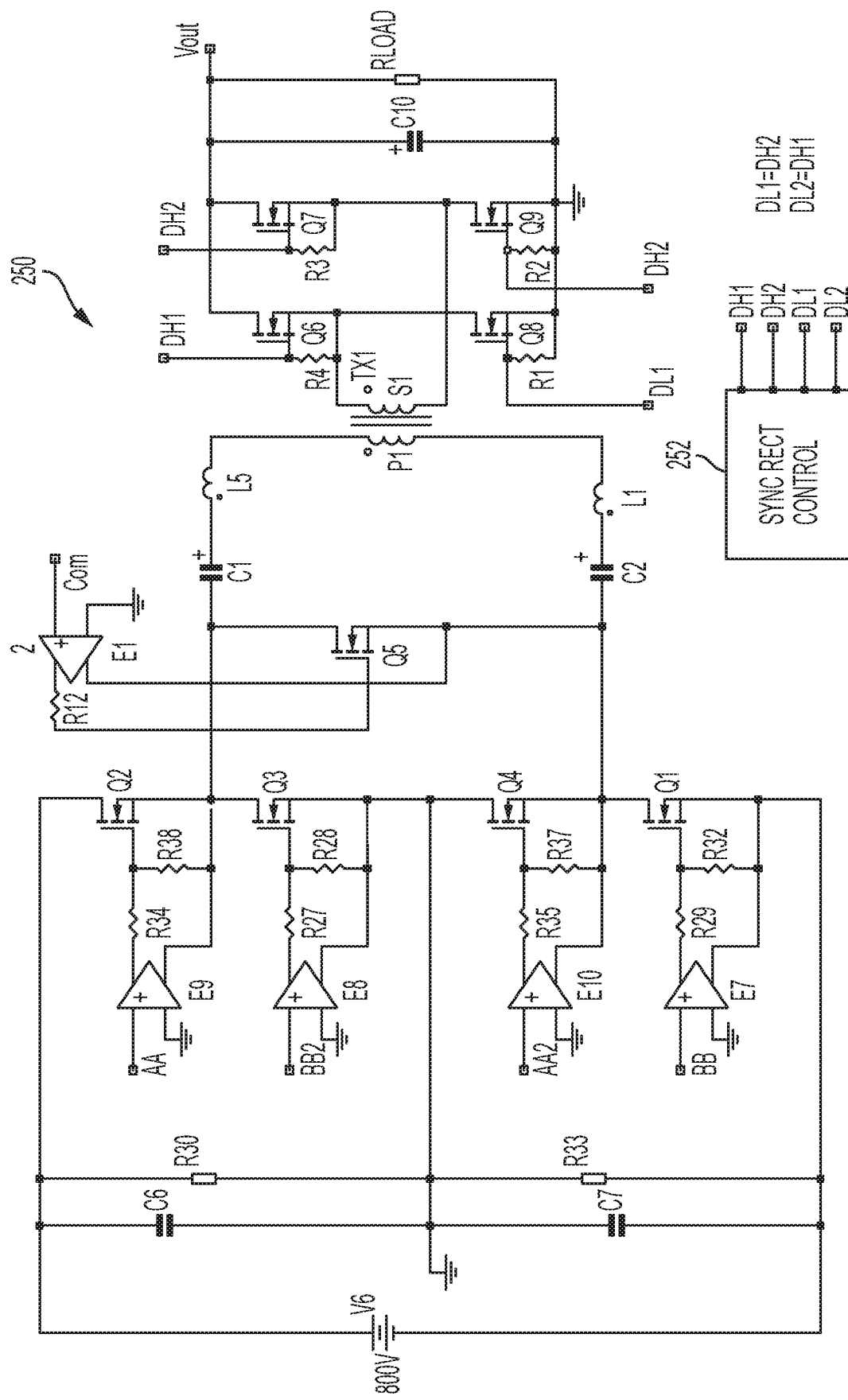
FIG. 8 is a circuit diagram of a power supply including a three-level LLC circuit and synchronous rectifier switches on a secondary side of the transformer.

For example, FIG. 8 illustrates an example power converter 250 where the diodes D1-D2 and D9-D10 have been replaced by secondary switches Q6, Q7, Q8 and Q9. A synchronous rectification controller 252 provides a control signal DH1 to the switch Q6 (coupled with the resistor R4), provides a control signal DH2 to the switch Q7 (coupled with the resistor R3), provides a control signal DL1 to the switch Q8 (coupled with the resistor R1), and provides a control signal DL2 to the switch Q9 (coupled with the resistor R2).

Figure 9:
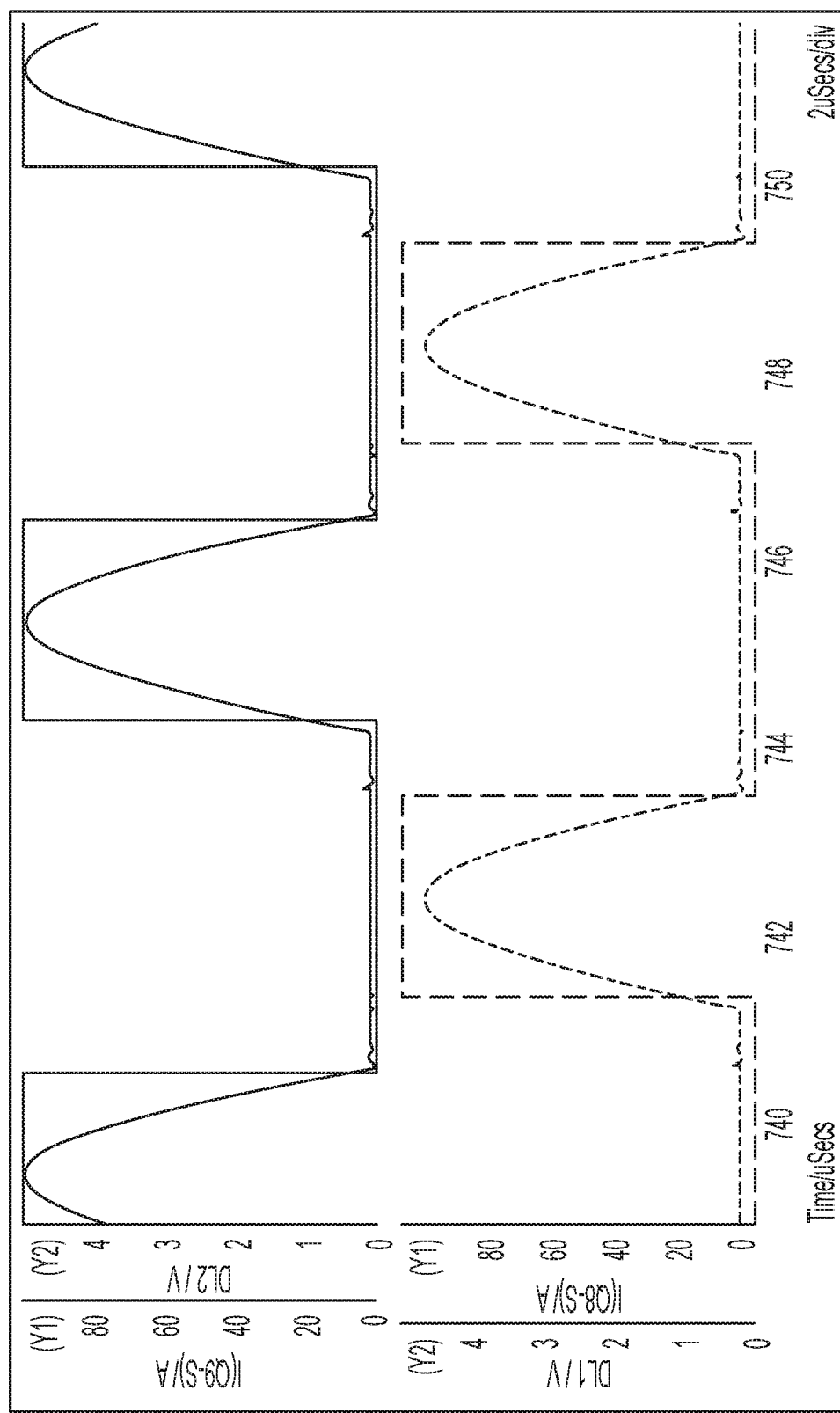
FIG. 9 is a graph of example control signals supplied to synchronous rectifier switches of the power supply of FIG. 8, and resulting currents through the synchronous rectifier switches.

The secondary switches Q6-Q9 may be turned on and/or turned off with zero-voltage switching (ZVS) and/or zero-current switching (ZCS). FIG. 9 illustrates example control signals DL1 and DL2, and the corresponding currents in the switches Q8 and Q9. As shown in FIG. 9, the switches Q8 and Q9 may be turned on and/or turned on when the current is approximately zero.

Referring back to FIG. 3, the power supply 200 includes a capacitor C1 and an inductor L5 coupled between the primary winding(s) P1 (e.g., the primary side) of the transformer TX1 and the half-bridge formed by the switches Q2 and Q3, and a capacitor C2 and an inductor L1 coupled between the primary winding(s) P1 of the transformer TX1 and the half-bridge defined by the switches Q1 and Q4.

The capacitors C1 and C2, and the inductors L5 and L1, may be split resonant components. In other embodiments, the capacitor C1 and the inductor L1 may be used alone, the capacitor C2 and the inductor L1 may be used alone, etc. For example, a single inductor may be used with an inductance value equal to a sum of the inductances of the inductors L1 and L2, a single capacitor may be used having a capacitance equal to (C1*C2/(C1+C2)), etc.

The transformer Tx1 may be a step-down transformer, and the diodes D1, D2, D9 and D10 may form a rectifier bridge. The capacitor C10 may be a filter capacitor and RLOAD may be a load resistor. In some embodiments, all switches used in the power supply may be rated for 600 V, 650 V, etc.

As shown in FIG. 3, the power supply 200 may include a circuit ground 212, with the first half-bridge (i.e., the switches Q2 and Q3) coupled between the circuit ground 212 and the input terminal 202, and the second half-bridge (e.g., the switches Q1 and Q4) coupled between the circuit ground 212 and the input terminal 204.

A capacitor C6 is coupled between the circuit ground 212 and the input terminal 202, and a resistor R30 is coupled in parallel with the capacitor C6. A capacitor C7 is coupled between the circuit ground 212 and the input terminal 204, and a resistor R33 is coupled in parallel with the capacitor C7.

In some embodiments, capacitance values of the capacitors C6 and C7 may be the same (e.g., exactly equal, within one percent of each other, within five percent of each other, within manufacturing tolerances, etc.), to divide the DC voltage equally across the capacitors C6 and C7 (e.g., exactly equal, within one percent of each other, within five percent of each other, etc.).

For example, the capacitance values of the capacitors C6 and C7 may be the same to split the input voltage with fifty percent each, while the resistors R30 and R33 maintain the balance of the voltages. As mentioned above, the switches Q2, Q3 may form one half-bridge across the capacitor C6, and the switches Q4, Q1 may form another half-bridge across the capacitor C7.

FIG. 3 illustrates the input power source V6 (e.g., a voltage source) as supplying an 800 Volt DC voltage. In other embodiments, the input power source may supply other suitable voltages above or below 800 V, the power supply 200 may be a stage of an AC-DC converter that converts an AC input (e.g., a three-phase AC input, etc.) into a DC voltage that is supplied to the power supply 200 (e.g., as the power source V6), etc. For example, the input power source V6 may be an output of a PFC converter stage of an AC-DC converter.

The switch Q5 may be the only switch coupled across the switches Q3 and Q4, to reduce conduction losses when the switch Q5 is turned on. The switch Q5 may short the switches Q3 and Q4 when the switch Q5 is turned on.

As shown in FIG. 3, the switch Q2 is driven by a control signal AA via an isolated driver E9 and the resistors R34 and R38, the switch Q3 is driven by a control signal BB2 via an isolated driver E8 and the resistors R27 and R28, the switch Q4 is driven by a control signal AA2 via an isolated driver E10 and the resistors R35 and R37, the switch Q1 is driven by a control signal BB via an isolated driver E7 and the resistors R29 and R32, and the switch Q5 is driven by a control signal Corn via an isolated driver E1 and a resistor R12. The control signals AA, BB, AA2, BB2 and Corn may be generated by the control circuit 210 as explained further below.

The switches Q1-Q5 may include any suitable switching devices, such as bipolar-junction switch (BJTs), metal-oxide semiconductor field-effect transistors (MOSFETs), Silicon Carbide (SiC) FETs, etc. Although the power supply 200 illustrates one specific arrangement of four switches in the three-level LLC circuit, other embodiments may include more or less switches, capacitors, inductors, resistors, etc., which may be arranged in other suitable three-level LLC circuit topologies.

Referring now to FIG. 4, the control circuit 210 includes two D flip-flops U9 and U19 coupled with the voltage-controlled oscillator (VCO). The D flip-flops U9 and U19 may divide a frequency output by the VCO in half. For example, the VCO may receive a voltage from an output of a compensator, and output a frequency corresponding to the voltage received from the output of the compensator.

The logic gates U17 and U30 are coupled with the flip-flop U19 to generate a fifty percent duty cycle, and the logic gages U2 and U3 are coupled between the flip-flops U19 and U9 to generate a complimentary fifty percent duty cycle. The logic cages U17, U30 and the logic gates U2, U3 may each be considered as forming a delay circuit.

The logic gates U13 and U14 are each coupled to convert the respective fifty percent duty cycles to twenty-five percent duty cycles with dead time, for supplying control signals AA and BB to the switches Q2 and Q1, respectively. The logic gates U7 and U8, and the logical OR gate U1, supply the control signal Com to the switch Q5. The logic gates U4 and U5 supply the control signals AA2 and BB2 to the switches Q4 and Q3, respectively.

For example, the VCO may convert an output voltage of the compensator to frequency, and the D flip-flops U9, U19 may divide the frequency by 2. The logic gates U3, U2 and U17, U30 provide a dead time between the complimentary pair with a fifty percent duty cycle from the flip-flop U19. The logic gates U14, U13 may convert the fifty percent duty cycle to twenty-five percent duty cycles with dead time, whereas the logic gates U7, U8 and U1 together provide a complimentary pair for the OR-ed output (Com). The control signals AA2 and BB2 are the drive signals for the switches Q4 and Q3, respectively.

Figure 5:
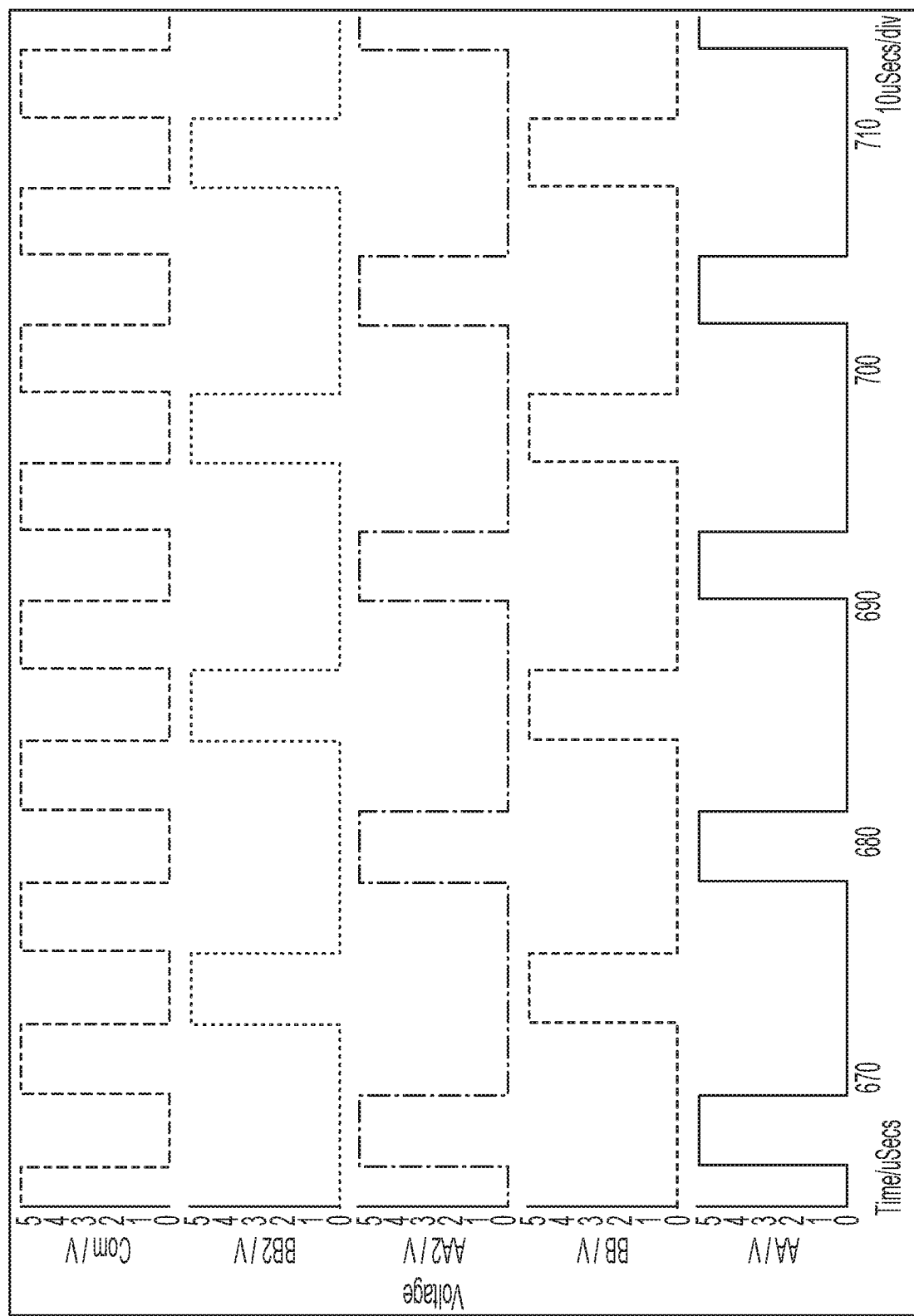
FIG. 5 is a graph of example control signals generated by the control circuit of FIG. 4.
Figure 6:
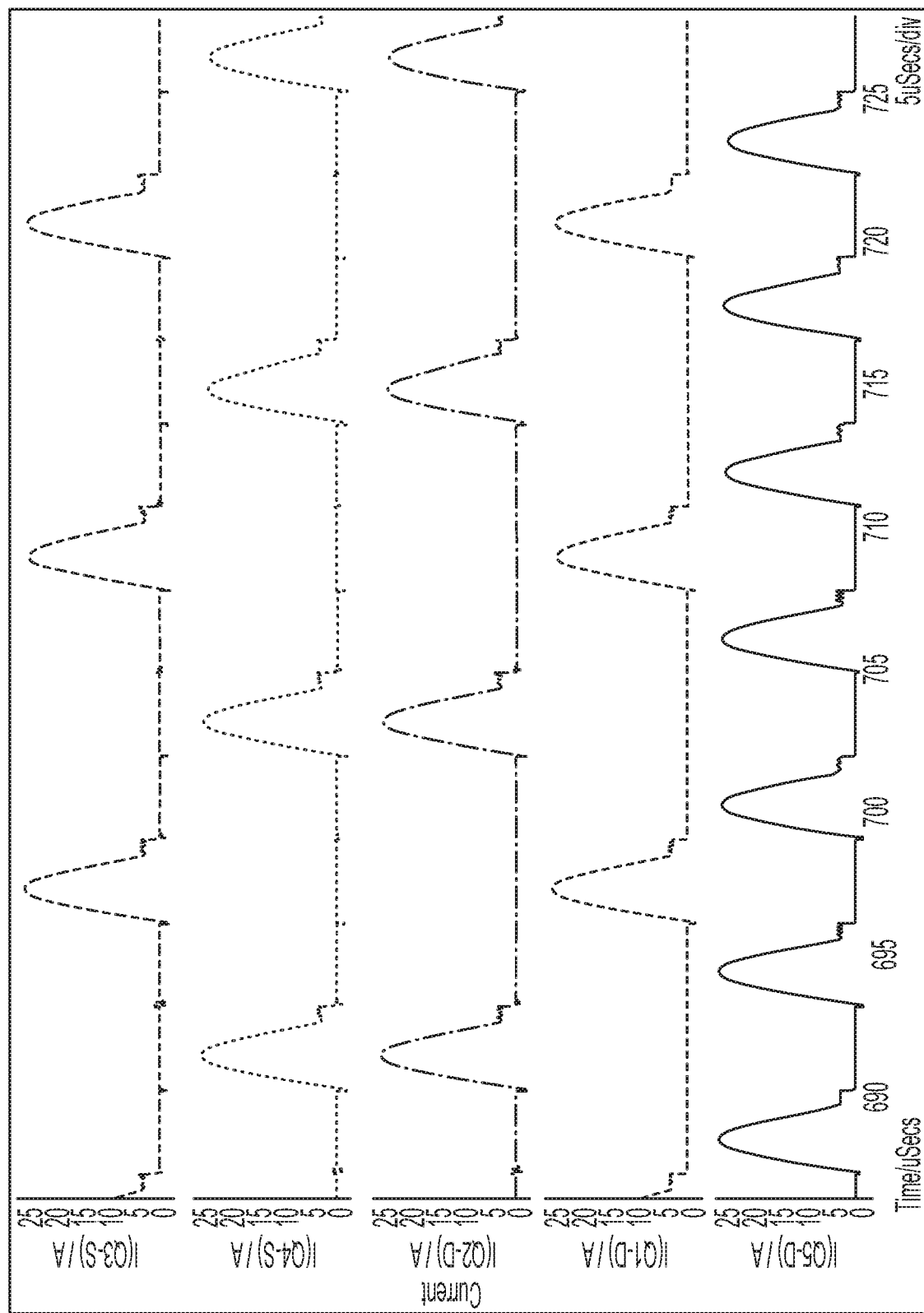
FIG. 6 is a graph of example current waveforms of the power supply of FIG. 3.

FIG. 5 illustrates example waveforms of the control signals AA, BB, AA2, BB2 and Com during operation of the power supply 200, and FIG. 6 illustrates example current waveforms through the corresponding switches Q1-Q4 and the switch Q5.

As shown in FIG. 5, the control circuit 210 is coupled to turn on and turn off the switches Q1 and Q3 at the same time (e.g., via the control signals BB and BB2). In an opposite phase, the control circuit 210 is coupled to turn on and turn off the switches Q2 and Q4 at the same time (e.g., via the control signals AA and AA2).

The switch Q5 is turned on (e.g., via the control signal Corn) while the switches Q1-Q4 are off, and the switch Q5 is turned off while the switches Q1-Q4 are off. As shown in FIG. 5, the switch Q5 is turned on twice as often as the switches Q1-Q4, for a total duration that is double the duration of each individual switch Q1-Q4.

For example, the switch Q5 conducts twice for every conduction of the switches Q1-Q4, so the switch Q5 conducts two half-cycles of current compared to the switches Q1-Q4 and the RMS current of the switch Q5 will be 1.414 times higher than the RMS current of any of the switches Q1-Q4. The arrangement of switches in the power supply 200 provides for conduction losses through only one switch when Q5 is turned on, as compared to the arrangement without the switch Q5 where both the switches Q3 and Q4 would experience conduction losses. Therefore, the conduction losses with the switch Q5 are lower than the conduction losses without the switch Q5.

Although FIG. 4 illustrates one example arrangement of the flip-flops and logic gates for providing the control signal pattern of FIG. 5, other embodiments may include flip-flops and logic gates coupled in other arrangements, control signals supplied with different timing waveforms, etc.

The power supply 200 may provide numerous advantages over conventional three-level LLC circuits. For example, the power supply 200 may provide an LLC topology that is suitable for an 800 V input (or other suitable high voltage input) with a control circuit that allows for a reduced transformer ratio as compared to a conventional three-level LLC circuit.

The power supply 200 may provide ZVS operation for all the primary switches and ZVS and ZCS operation for all the secondary switches, such as when the operating frequency is equal to or below the resonant frequency. The primary to secondary turns ratio of the transformer may be about 50% of the turns ratio for a transformer used with a conventional three-level LLC circuit control method. This allows for improved optimization of the transformer for efficiency.

For example, a transformer designed for a conventional LLC topology that receives a 400 V input DC may be instead used with an 800 V DC input. The input to the power supply 200 may be a three-phase AC input, a single-phase AC input with an 800 V PFC output using a voltage doubler boost circuit, etc.

Figure 7:
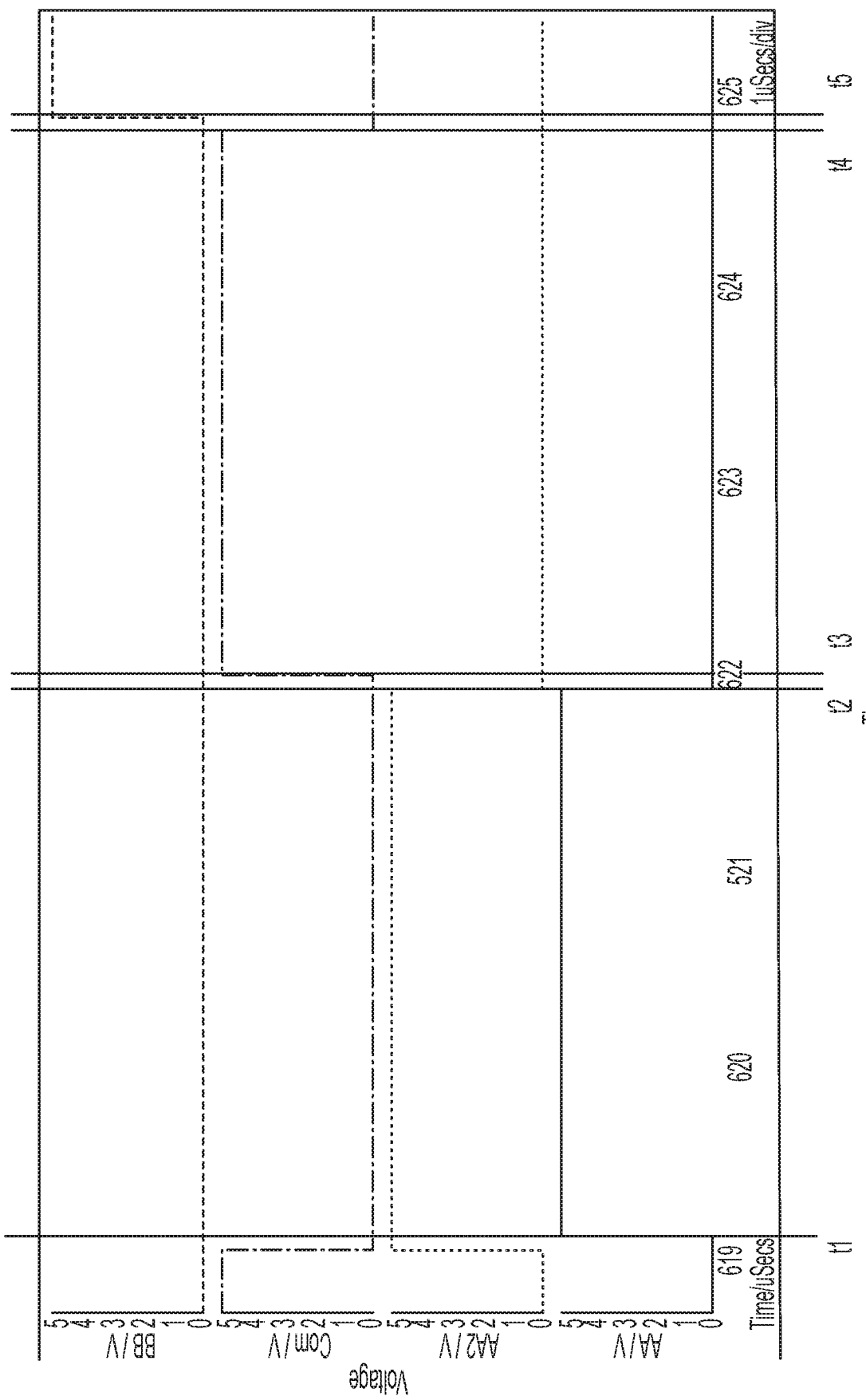
FIG. 7 is a graph of example control signals during one turn on and turn on sequence of switches of the power supply of FIG. 3.

FIG. 7 illustrates example timing of the control signals AA, BB, AA2 and BB2 during one turn on and turn off sequence. As shown in FIG. 7, during the time period t1-t2, the switches Q2 and Q4 are conducting and delivering the power to the output from the capacitor C6.

At time t2, the switch Q2 is turned off. During the time period t2-t3, the Coss of the switches Q3 and Q5 will discharge and the switch Q2 will charge through the capacitors C1, C2, the inductors L1, L5, and the transformer Tx1.

At the time t3, the switch Q5 is turned on after the switch Q2 is fully charged (ZVS) to the voltage across the capacitor C6. The resonant capacitors will discharge through the switch Q5, delivering the charge to the output, and the switch Q5 is turned off at time t4.

During the time period t4-t5, the Coss of the switches Q5 and Q4 will charge, and the Coss of the switch Q1 will discharge through the switch Q3, the capacitor C7, the resonant components and transformer Tx1. The switch Q1 will be turned on when the current flows through its body diode, thereby achieving ZVS. In a similar manner, ZVS for the switch Q2 is achieved after the switch Q5 is turned off, when the current is forced through its body diode, the capacitor C6 and the switch Q4.

Figure 10:
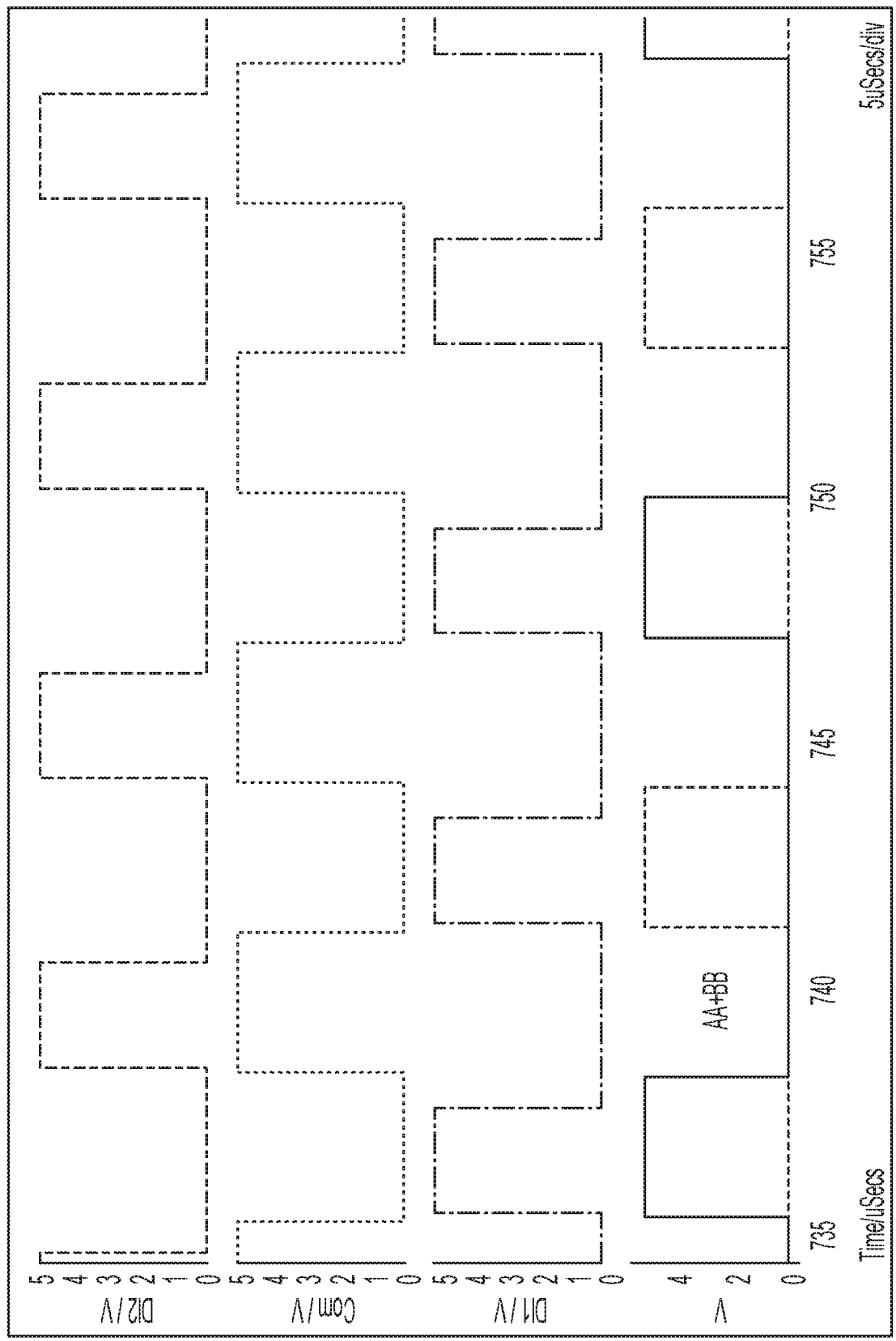
FIG. 10 is a graph of example control signals supplied to synchronous rectifier switches and primary switches of the power supply of FIG. 8.

FIG. 10 illustrates example control signals DL1 and DL2 for the secondary switches Q8 and Q9, with reference to the control signals Com and AA+BB. As shown in FIG. 10, the control signal DL1 turns on the switch Q8 while Com is low (e.g., based on logical high values of AA+BB), and the control signal DL2 turns on the switch Q9 while Com is high (e.g., based on low values of AA+BB).

For example, the control signals DL1 And DH2 may be synchronized with (AA+BB), while the control signals DL2 and DH1 are synchronized with the Com drive signals. The on-time of the synchronous rectifier FETs Q6-Q9 may be smaller than the resonant half-period of the LLC tank when the switching frequency is equal to or below the resonant frequency.

When the switching frequency is above the resonant frequency, the -time may be equal to the corresponding drive signals of the primary FETs Q1-Q4, (e.g., the on-time of the control signals DL1 and DH2 may be the same as (AA+BB), and DL2 and DH1 may be the same as Com). However, it may be necessary to delay the turn on of the synchronous rectifier FETs Q6-Q9 compared to corresponding primary FETs Q1-Q4 in order to avoid reverse current as the conduction mode goes deeper into the continuous mode. Intelligent commercial analog control integrated circuits may be available for controlling the synchronous rectifier FETs Q6-Q9.

According to another aspect of the present disclosure, a switch mode power supply includes a pair of input terminals for receiving an alternating current (AC) or direct current (DC) voltage input from an input power source, a pair of output terminals for supplying a direct current (DC) voltage output to a load, a circuit ground, and at least four switches coupled in a three-level LLC circuit arrangement between the pair of input terminals and the pair of output terminals.

First and second ones of the at least four switches define a first half-bridge, and third and fourth ones of the at least four switches define a second half-bridge. The first half-bridge is coupled between the circuit ground and a first one of the pair of input terminals, and the second half-bridge is coupled between the circuit ground and a second one of the pair of input terminals. The power supply also includes a fifth switch coupled across the second switch and the third switch to short circuit the second switch and the third switch when the fifth switch is closed.

The power supply may include a transformer and multiple secondary switches, wherein the at least four switches are coupled with a primary side of the transformer and the multiple secondary switches are coupled with a secondary side of the transformer. A first capacitor and a first inductor may be coupled between the primary side of the transformer and the first half-bridge, and a second capacitor and a second inductor may be coupled between the primary side of the transformer and the second half-bridge.

A first capacitor may be coupled between the circuit ground and the first input terminal, and a second capacitor may be coupled between the circuit ground and the second input terminal. A first resistor may be coupled between the circuit ground and the first input terminal, and a second resistor may be coupled between the circuit ground and the second input terminal. In some embodiments, only the single fifth switch may be coupled across the second switch and the third switch.

According to another aspect of the present disclosure, a switch-mode power supply includes a pair of input terminals for receiving an alternating current (AC) or direct current (DC) voltage input from an input power source, a pair of output terminals for supplying a direct current (DC) voltage output to a load, a transformer having a primary side and a secondary side, and at least four switches coupled in a three-level LLC circuit arrangement between the pair of input terminals and the primary side of the transformer.

First and second ones of the at least four switches define a first half-bridge and third and fourth ones of the at least four switches define a second half-bridge. The power supply also includes a control circuit. The control circuit includes a voltage-controlled oscillator (VCO) and multiple logic gates and flip-flops coupled to operate the at least four switches with zero-voltage switching (ZVS).

The control circuit may include a compensator, a phase comparator and a delay circuit coupled to provide a dead time to achieve the ZVS of the at least four switches. The multiple flip-flops may include at least two D flip-flops coupled to divide a frequency output by the VCO in half, and first and second pairs of the multiple logic gates may be coupled to a first one of the D flip-flops to generate a fifty percent duty cycle for controlling the at least four switches.

In some embodiments, fifth and sixth ones of the multiple logic gates may be coupled to the second one of the D flip-flops to generate a twenty-five percent duty cycle, and a seventh one of the multiple logic gates may comprise an OR gate coupled to receive the output of the fifth and sixth gates to control the fifth switch. The control circuit may be coupled to turn on and turn off the first and third switches at the same time, turn on and turn off the second and fourth switches at the same time, turn on the fifth switch while the four switches are turned off, and turn off the fifth switch while the four switches are turned on.

Figure 11:
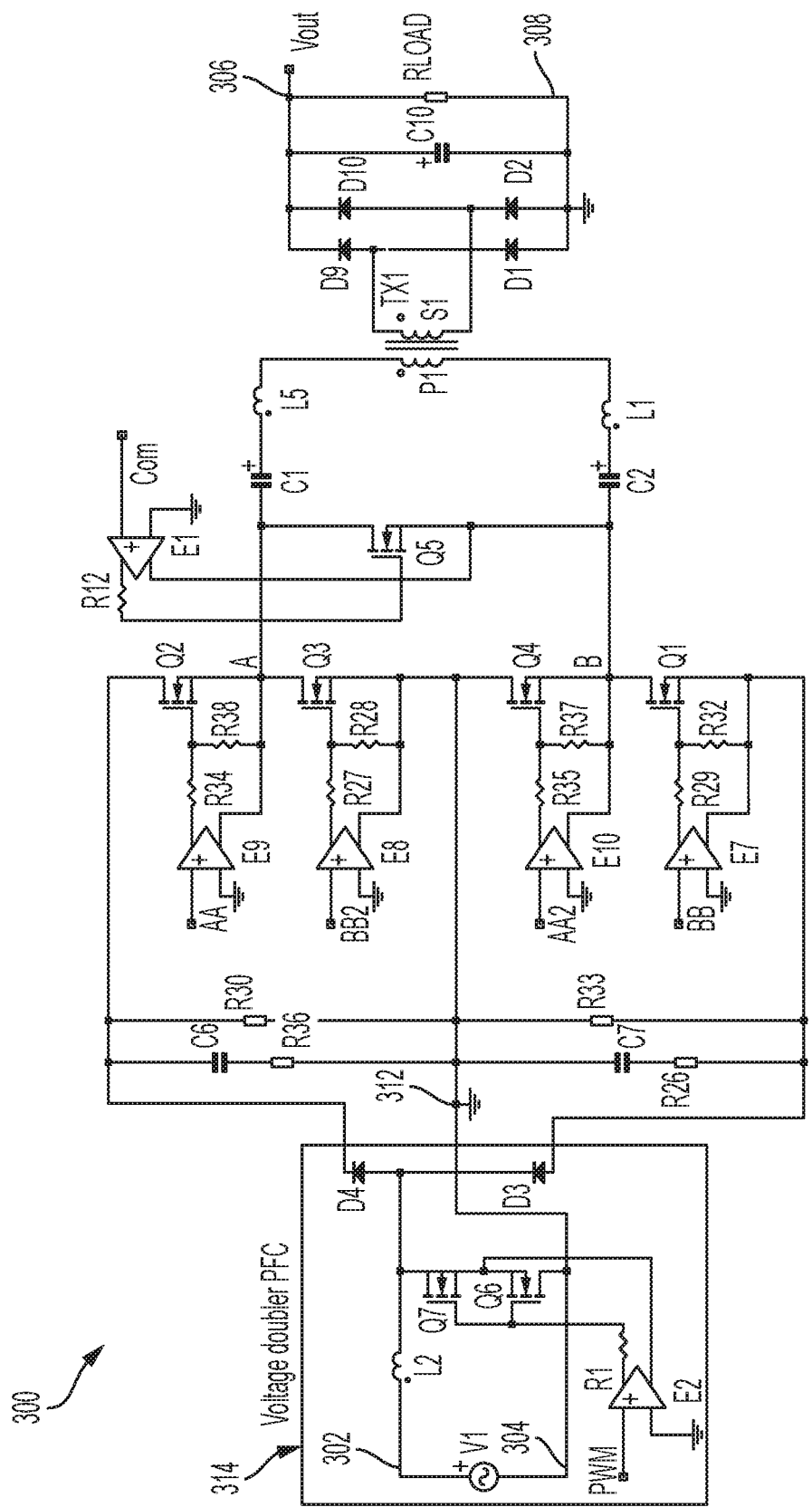
FIG. 11 is a circuit diagram of a power supply including a voltage doubler PFC circuit, according to another example embodiment of the present disclosure.

According to another aspect of the present disclosure, a switch-mode power supply 300 is illustrated in FIG. 11. The power supply 300 includes a pair of input terminals 302 and 304 for receiving an alternating current (AC) voltage input from an input power source V1, a pair of output terminals 306 and 308 for supplying a direct current (DC) voltage output (Vout) to a load (RLOAD), and four switches Q1-Q4 coupled in a three-level LLC circuit arrangement between the pair of input terminals 302, 304 and the pair of output terminals 306 and 308.

The power supply also includes a voltage doubler power factor correction (PFC) circuit 314 coupled between the pair of input terminals 302, 304 and the three-level LLC circuit, and a control circuit 310 (shown in FIG. 12) coupled to operate the four switches Q1-Q4 to supply the DC voltage output (Vout) to the load (RLOAD).

The three-level LLC circuit arrangement of the power supply 300 may be similar to the three-level LLC circuit arrangement of the power supply 200, so descriptions of some of the components of the power supply 300 will not be repeated again here.

The voltage doubler PFC circuit 314 is configured to supply a first PFC voltage output to the three-level LLC circuit arrangement when the AC voltage input V1 is within a specified low line voltage range, and the voltage doubler PFC circuit 314 is configured to supply a second PFC voltage output to the three-level LLC circuit arrangement when the AC voltage input V1 is within a specified high line voltage range.

The second PFC voltage output may be greater than the first PFC voltage output. For example, the second PFC voltage output may be double the first PFC voltage output. In some embodiments, the second PFC output voltage may be at least 800 Volts (e.g., about 880 Volts, etc.), and the first PFC output voltage may be at least 400 Volts (e.g., about 440 Volts, etc.).

The specified low line voltage range may be different than the specified high line voltage range. In some embodiments, the first PFC voltage output may be greater than the specified low line voltage range, and the second PFC voltage output may be greater than the specified high line voltage range.

For example, the power supply 300 may be designed to have any suitable AC voltage input, such as an AC voltage input in the range of 85 V to 305 V, etc. The voltage doubler PFC circuit (e.g., a front-end PFC) may increase a low line input (e.g., 85 V to 140 V AC, etc.) to a first PFC output voltage (e.g., about 440 V DC), and may increase a high line input (e.g., 85 V to 277 V AC, 180 V to 305 V AC, etc.) to a higher PFC output voltage (e.g., about 880 V DC, etc.).

The power supply 300 may be used in any suitable application, such as a hyper-scale application, telecommunications, server power supplies, etc. The voltage doubler PFC circuit may use any suitable voltage input and output ranges, including ratios of 1:2, etc.

As shown in FIG. 11, the voltage doubler PFC circuit 314 includes two PFC circuit switches Q6 and Q7. The control circuit 310 may include two voltage references (e.g., the voltage references V2 and V3 illustrated in the power supply 400 of FIG. 11). The two voltage references are different from one another (e.g., 2.5 V and 5 V, etc.).

The control circuit 310 may be configured to receive a sensed AC input voltage and determine whether the sensed AC input voltage is within the specified low line voltage range or the specified high line voltage range. The control circuit 310 may then operate the PFC circuit switches Q6 and Q7 according to the first voltage reference (e.g., V2) when the AC voltage input V1 is within the specified low line voltage range, and operate the PFC circuit switches Q6 and Q7 according to the second voltage reference (e.g., V3) when the AC voltage input V1 is within the specified high line voltage range.

The voltage doubler PFC circuit 314 may include an inductor L2, two diodes D3 and D4, and two capacitors (e.g., the capacitors C6 and C7). The two PFC circuit switches Q6 and Q7 are coupled between the inductor L2 and the input terminal 304.

Each diode D3 and D4 is coupled between the inductor L2 and the three-level LLC circuit arrangement. Each capacitor may be coupled between a corresponding one of the didoes D3 and D4 a circuit ground 312. The control circuit 310 (or a separate control circuit) may be configured to control the switches Q6 and Q7 via a pulse-width modulation (PWM) signal.

For example, the switches Q6 and Q7 may conduct current during the on-time of the PWM signal. During the off-time, the diode D4 may conduct current during the positive half-cycle of the AC input and the diode D3 may conduct during the negative half-cycle of the AC input.

During low line (e.g., 85V-140V AC, etc.), the PFC output may be at a first value (e.g., 440 V DC). When the input AC line voltage is in a high line input range (e.g., 180-305V AC), the PFC output may be at a higher value (e.g., 880 V DC).

For example, during the positive line voltage half-cycle, the switches Q6 and Q7 will be turned on during the on-time of the PWM control signal, and current will flow starting from the input terminal 302, through the inductor L2, and through the switches Q6 and Q7 to the input terminal 304, which may be connected to the circuit ground 312 or a mid-point two capacitors C6 and C7.

During the off-time of the PWM control signal, the current through the inductor L2 will continue to flow through the diode D4, through a capacitor C6 and back to the input terminal 304 connected to the circuit ground 312. Therefore, during the entire positive line half-cycle the capacitor C6 will be charged through D1.

During the negative line voltage half-cycle, the switches Q6 and Q7 will be turned on during the on-time of the PWM control signal, and the current will flow starting from the circuit ground 312 connected with the input terminal 304, through the switches Q6 and Q7, and through the inductor L2 to the input terminal 302.

During the off-time of the PWM control signal, the current through the inductor L2 will continue to flow through the input power source V1, the capacitor C7), and the diode D3, back to the input terminal 302. Therefore, during the entire negative half-cycle, the capacitor C7 will be charged through the diode D3.

Although FIG. 11 illustrates one specific arrangement of components in the voltage doubler PFC circuit 314 (which may have lower conduction losses than other circuits), other circuits may include more or less switches, inductors, diodes or capacitors, components arranged in other suitable circuit topologies, etc.

In some embodiments, the control circuit 310 may be configured to operate the switches Q1-Q4 of the three-level LLC circuit arrangement in a first mode of operation when the AC voltage input V1 is within the specified low line voltage range, and operate the switches Q1-Q4 of the three-level LLC circuit arrangement in a second mode of operation when the AC voltage input V1 is within the specified high line voltage range. The first mode of operation may be symmetrical half-bridge (SHB) operation and the second mode of operation may be asymmetrical half-bridge (AHB) operation.

As shown in FIG. 11, the switches Q2 and Q3 form a first half-bridge, and the switches Q1 and Q4 form a second half-bridge. The power supply 300 includes a switch Q5 coupled across the switches Q3 and Q4 to short the switches Q3 and Q4 when the switch is closed. Although FIG. 11 illustrates the switch Q5, in some embodiments the power supply may not include a switch Q5.

Figure 12:
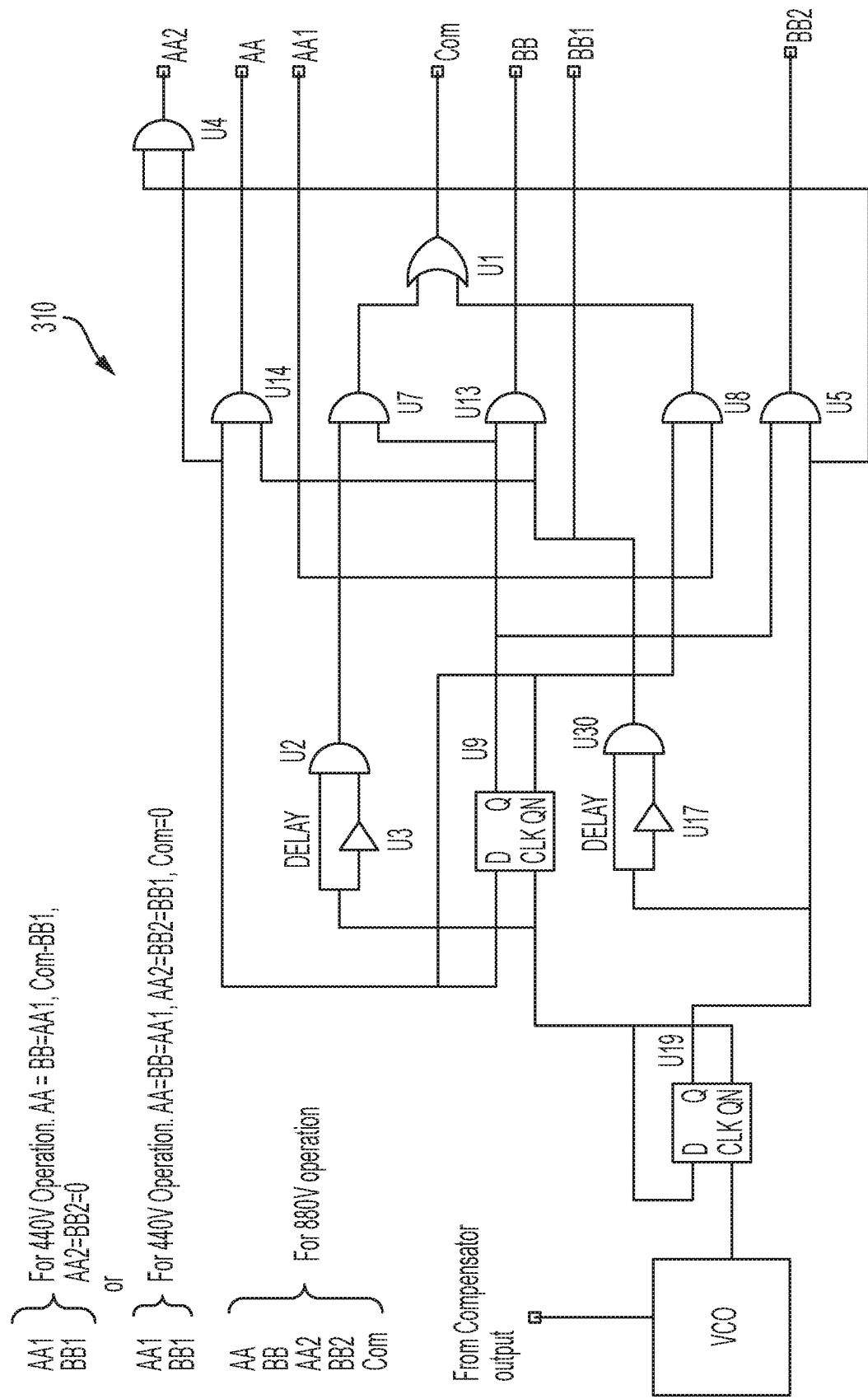
FIG. 12 is a circuit diagram of a control circuit of the power supply of FIG. 11.

FIG. 12 illustrates the control circuit 310 of the power supply 300. As shown in FIG. 12, the control circuit 310 includes a voltage-controlled oscillator (VCO), and multiple logic gates and flip-flops coupled to operate the at least four switches according to a frequency output by the VCO.

The control circuit 310 of the power supply 300 may be similar to the control circuit 210 of the power supply 200, with the addition of the control signals AA1 and BB1, so descriptions of some of the components of the control circuit 310 will not be repeated again here. As described further below, the control circuit 310 may selectively provide different control signals depending on the SHB or AHB mode of operation of the power supply 300.

For example, the control circuit 310 may be configured to, when operating in the SHB mode of operation, supply a first control signal AA to the switches Q1 and Q2, supply a second control signal BB to the switches Q3 and Q4, and turn off the switch Q5.

Figure 13:
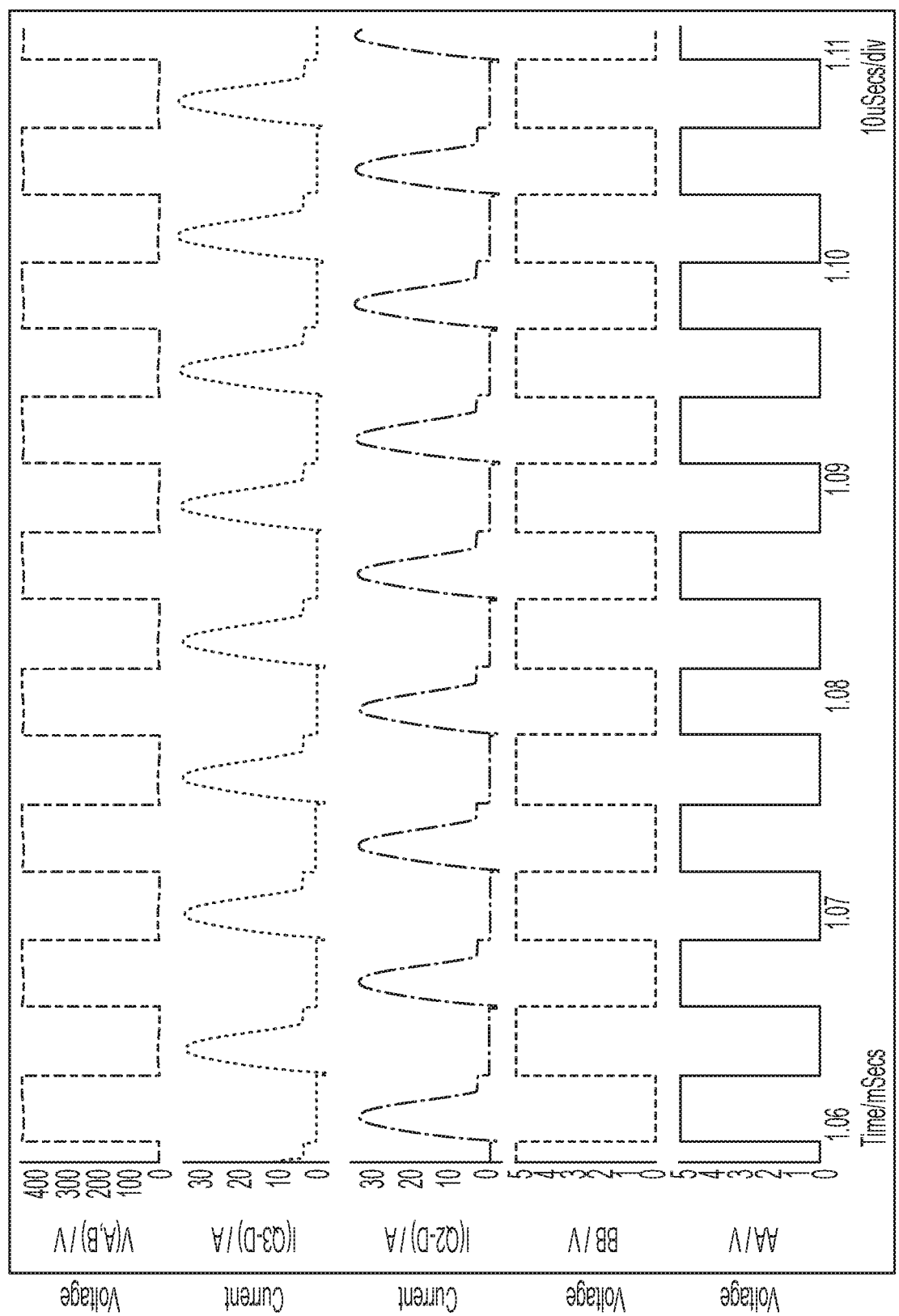
FIG. 13 is a graph of example current and voltage waveforms of the power supply of FIG. 11.

FIG. 13 illustrates example waveforms of the control signals AA and BB supplied by the control circuit 310 during the SHB mode of operation. FIG. 13 also illustrates example waveforms of the current through the switches Q2 and Q3, and a voltage between the nodes A and B in the power supply 300 (as shown in FIG. 11), during the SHB mode of operation.

The control circuit 310 may be configured to, when the operating in the AHB mode of operation, supply control signals AA and AA2 to turn on the switches Q2 and Q4 at the same time, and supply control signals BB and BB2 to turn on the switches Q1 and Q3 at the same time, as shown in FIG. 5. The control circuit 310 may turn on the switches Q2 and Q4 in an opposite phase to the switches Q1 and Q3, and turn on the switch Q5 while the switches Q1-Q4 are turned off.

Alternatively, the control signal BB may be supplied to the switch Q5 instead of the switches Q3 and Q4, where the switches Q3 and Q4 are in an off state with AA2=BB2=0. This may allow energy transfer from the resonant capacitors C1 and C2 to the output, and may reduce conduction losses to about fifty percent as only the single switch Q5 conducts current instead of two switches Q3 and Q4.

Figure 14:
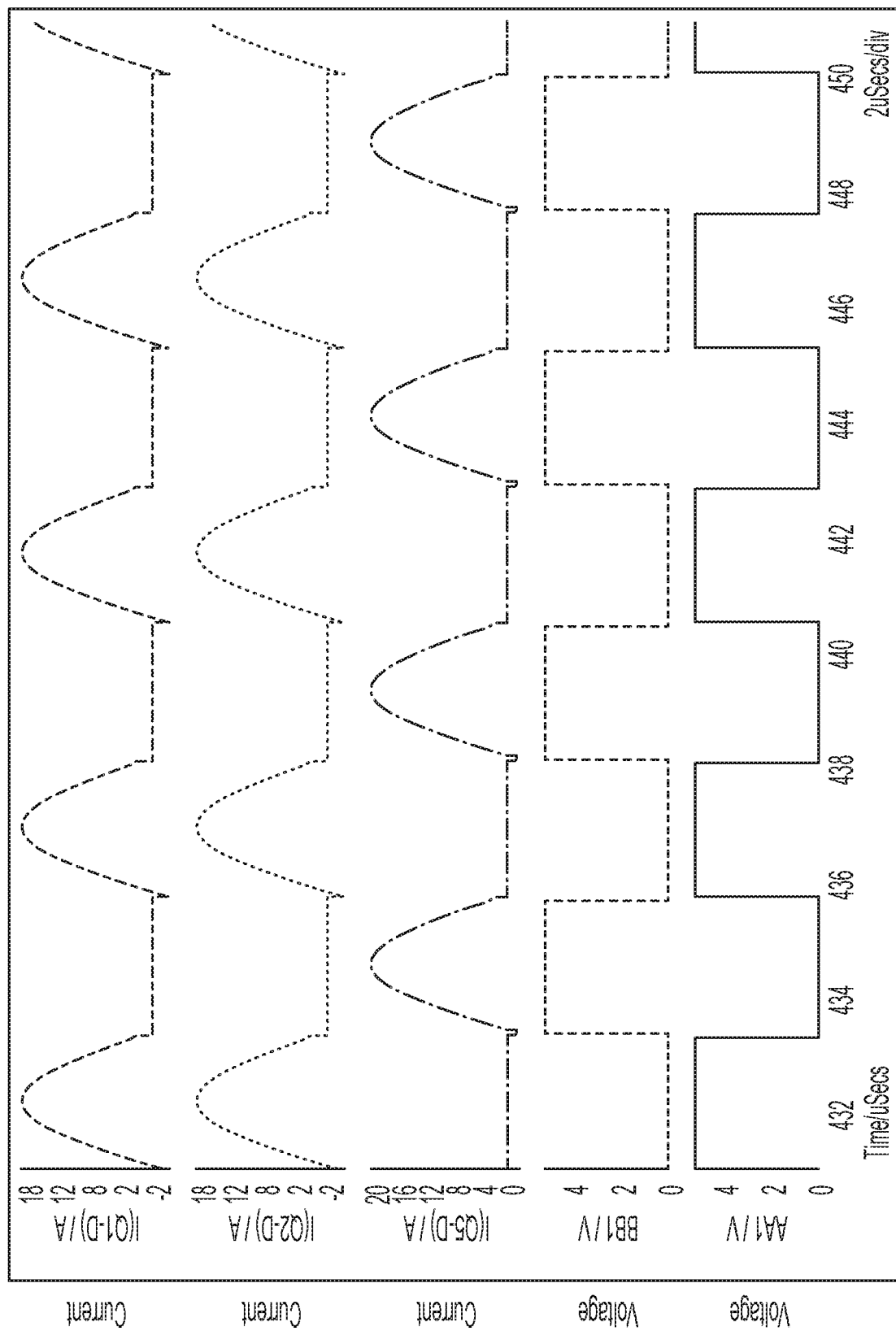
FIG. 14 is a graph of example current and voltage waveforms of the power supply of FIG. 11 during another mode of operation.

FIG. 14 illustrates example waveforms of the control signals AA1 and BB1 that may be supplied by the control circuit 310 during the SHB mode of operation. FIG. 14 also illustrates example waveforms of the current through the switches Q1, Q2 and Q5. As shown in FIG. 14, the control signal BB1 turns on the switch Q5 while the switches Q1 and Q2 are off, which may reduce conduction losses as only the single switch Q5 conducts current.

In view of the above, during the SHB mode the control circuit 310 may select AA1 and BB1, while Com is zero, or set AA1=AA=BB and Com=BB1. During the AHB mode, the control circuit 310 may select AA, BB, AA2, BB2 and Com.

Referring again to FIG. 11, in some embodiments the control circuit 310 is configured to operate the switches Q1-Q4 to maintain a voltage between the node A (e.g., an output of the first half-bridge) and the node B (e.g., an output of the second half-bridge) to be the same when operating in the SHB mode of operation as when operating in the AHB mode of operation.

For example, the maintained voltage between the nodes A and B may be same as the output of the voltage doubler PFC circuit 314 for the low line voltage input range (e.g., about 440 V), regardless of whether the AC voltage input is in the low line voltage input range or the high line voltage input range.

For example, FIG. 6 illustrates example current waveforms for the switches Q1-Q5 during the AHB mode of operation. In the AHB mode, the switches Q1-Q4 and may see fifty percent of the input voltage. Because the PFC doubler output voltage is, e.g., 880 V at high line, the voltage across the nodes A and B of the power supply 300 will be, e.g., 440 V.

FIG. 13 illustrates example control signals and currents for switches Q2 and Q3 during the SHB mode of operation for low line input voltages. As shown in FIG. 13, the switches Q1 and Q2 receive the same drive signal AA. while the switches Q3 and Q4 receive the same drive signal BB. The current through the switches Q1, Q2 will be the same as I(Q2−D), while the current through the switches Q3, Q4 will be same as I(Q3−D). Therefore, the voltage across the nodes A and B of the power supply 300 will be equal to the PFC output voltage in the low line condition, e.g., 440 V.

Therefore, the asymmetrical half-bridge mode may only allow half (e.g., 440 V) of the PFC output voltage (e.g., 880 V) for the high line input to be applied to the LLC components of the three-level LLC circuit. During the low line input, the three-level LLC circuit is operated in the symmetrical half-bridge mode so that the voltage between the nodes A and B (e.g., 440 V) is equal to the output of the PFC (e.g., 440 V).

These two modes of operation may be based on a mode change scheme where the input voltage to the voltage doubler PFC circuit 314 is sensed between a low line input (e.g., 85 V to 140 V AC, etc.), and a high line input (e.g., 85 V to 277 V, 180 V to 305 V, etc.), and the PFC output is set to a corresponding low (e.g., 440 V) or high (e.g., 880 V) value. Therefore, the PFC circuit 314 may operate as a voltage doubler at low and high line voltage input ranges.

Thus, the node voltage between nodes A and B is maintained at, e.g., 440 V, during both low line and high line PFC circuit operations. Therefore, the same LLC resonant components, main transformer and output rectifier components can be used, even though the LLC operates from, e.g., 440V at low line, and, e.g., 880V at high line.

The power supply 300 may provide one or more advantages, such as reduced conduction losses and increased efficiency compared to conventional three-level LLC circuits, lower boost voltages per capacitor (e.g., about 200 V) during low line input ranges to increase low line efficiency with a smaller boost ratio, a wider range of operation of the LLC because only a control mode change is required for different voltages and not a change to the power components, use of bulk capacitors in parallel during high line asymmetrical mode, etc.

Figure 15:
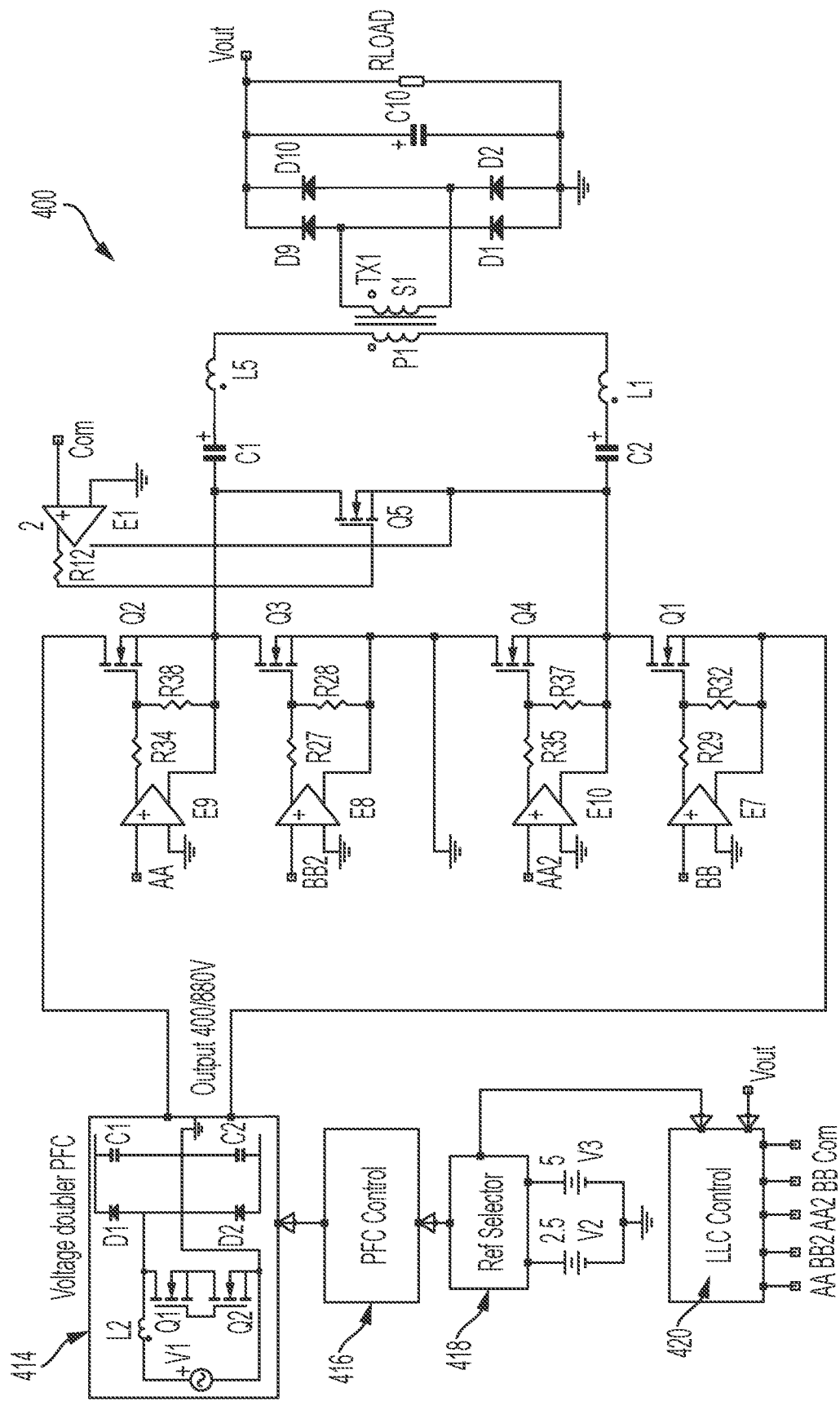
FIG. 15 is a circuit diagram of a power supply including a voltage reference selector, according to another example embodiment of the present disclosure.

FIG. 15 illustrates an example power supply 400 according to another aspect of the present disclosure. The power supply 400 includes a three-level LLC circuit arrangement, which may be similar to the three-level LLC circuit arrangements of the power supplies 200 and 300.

The power supply 400 also includes a voltage doubler PFC circuit 414, and a control circuit. The control circuit includes a PFC control 416, a voltage reference selector 418, and an LLC control 420. The reference selector 418 may select the voltage reference V2 if the AC voltage input V1 is within a low line voltage range, and select the voltage reference V3 if the AC voltage input V1 is in a high line voltage range.

The PFC control 416 receives the selected voltage reference from the reference selector 418 and operates the voltage doubler PFC circuit to output the appropriate low or high voltage to the three-level LLC circuit. The LLC control 420 receives the selected voltage reference from the reference selector 418 and controls the switches Q1-Q4 to operate in the appropriate AHB or SHB mode.

As described herein, the example power supplies and control circuits may include a microprocessor, microcontroller, integrated circuit, digital signal processor, etc., which may include memory. The power supplies and control circuits may be configured to perform (e.g., operable to perform, etc.) any of the example processes described herein using any suitable hardware and/or software implementation. For example, the power supplies and controllers may execute computer-executable instructions stored in a memory, may include one or more logic gates, control circuitry, etc. The PFC doubler circuit may include any suitable circuit arrangement for boosting input voltages as described above.

According to another aspect of the present disclosure, a method of operating a switch-mode power supply is disclosed. The power supply includes a pair of input terminals, a pair of output terminals, at least four switches coupled in a three-level LLC circuit arrangement between the pair of input terminals and the pair of output terminals, and at least two PFC circuit switches coupled in a voltage doubler power factor correction (PFC) circuit coupled between the pair of input terminals and the three-level LLC circuit.

The method includes operating the at least two PFC switches of the voltage doubler circuit to increase an AC voltage input received at the pair of input terminals and supply the increased voltage to the three-level LLC circuit, and operating the at least four switches of the three-level LLC circuit to supply a DC voltage output to the pair of output terminals.

In some embodiments, operating the at least two PFC switches includes supplying a first PFC voltage output to the three-level LLC circuit arrangement when the AC voltage input is within a specified low line voltage range, and supplying a second PFC voltage output to the three-level LLC circuit arrangement when the AC voltage input is within a specified high line voltage range. The second PFC voltage output is greater than the first PFC voltage output, and the specified low line voltage range is different than the specified high line voltage range.

The power supply may include a first reference and a second reference, and the method may further include sensing the AC input voltage and determining whether the sensed AC input voltage is within the specified low line voltage range or the specified high line voltage range.

Operating the at least two PFC circuit switches may include operating the at least two PFC circuit switches according to the first voltage reference when the AC voltage input is within the specified low line voltage range, and operating the at least two PFC circuit switches according to the second voltage reference when the AC voltage input is within the specified high line voltage range.

In some embodiments, operating the at least four switches of the three-level LLC circuit may include operating the at least four switches of the three-level LLC circuit arrangement in a first mode of operation when the AC voltage input is within the specified low line voltage range, and operating the at least four switches of the three-level LLC circuit arrangement in a second mode of operation when the AC voltage input is within the specified high line voltage range. The first mode of operation may include symmetrical half-bridge (SHB) operation and the second mode of operation may include asymmetrical half-bridge (AHB) operation.

First and second ones of the at least four switches of the three-level LLC circuit arrangement may define a first half bridge and third and fourth ones of the at least four switches of the three-level LLC circuit arrangement define a second half bridge. The power supply further comprises a fifth switch coupled across the second switch and the third switch to short circuit the second switch and the third switch when the fifth switch is closed.

Operating the at least four switches of the three-level LLC circuit may include, when operating in the SHB mode of operation, supplying a first control signal to the first and second switches, supplying a second control signal to the third and fourth switches, and turning off the fifth switch.

Operating at least three of the switches of the three-level LLC circuit may include, when operating in the SHB mode of operation, supplying a first control signal to the first and second switches, and supplying a second control signal to the fifth switch while the third and fourth switches are turned off.

In some embodiments, operating the at least four switches of the three-level LLC circuit may include, when the operating in the AHB mode of operation, supplying control signals to turn on the first and third switches at the same time, turn on the second and fourth switches in an opposite phase to the first and third switches, and turn on the fifth switch while the at least four switches of the three-level LLC circuit arrangement are turned off.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch-mode power supply, comprising:
a pair of input terminals for receiving an alternating current (AC) or direct current (DC) voltage input from an input power source;
a pair of output terminals for supplying a direct current (DC) voltage output to a load;
at least four switches coupled in a three-level LLC circuit arrangement between the pair of input terminals and the pair of output terminals, with first and second ones of the at least four switches defining a first half-bridge and third and fourth ones of the at least four switches defining a second half-bridge;
a fifth switch coupled across the second switch and the third switch to short circuit the second switch and the third switch when the fifth switch is closed; and
a control circuit including a voltage-controlled oscillator (VCO) and multiple logic gates and flip-flops coupled to operate the at least four switches with zero-voltage switching (ZVS).

2. The power supply of claim 1, further comprising a transformer and multiple secondary switches, wherein the at least four switches of the three-level LLC circuit arrangement are coupled with a primary side of the transformer and the multiple secondary switches are coupled with a secondary side of the transformer.

3. The power supply of claim 2, further comprising:
a first capacitor and a first inductor coupled between the primary side of the transformer and the first half-bridge; and
a second capacitor and a second inductor coupled between the primary side of the transformer and the second half-bridge.

4. The power supply of claim 2, wherein the control circuit is coupled to operate the multiple secondary switches zero-voltage switching (ZVS) and zero-current switching (ZCS).

5. The power supply of claim 1, further comprising:
a circuit ground, with the first half-bridge coupled between the circuit ground and a first one of the pair of input terminals, and the second half-bridge coupled between the circuit ground and a second one of the pair of input terminals; and
first and second capacitors, with the first capacitor coupled between the circuit ground and the first input terminal, and the second capacitor coupled between the circuit ground and the second input terminal.

6. The power supply of claim 5, wherein capacitance values of the first and second capacitors are the same to divide the voltage input equally across the first and second capacitors.

7. The power supply of claim 1, wherein the control circuit further includes a compensator, a phase comparator and a delay circuit coupled to provide a dead time to achieve the ZVS of the at least four switches coupled in the three-level LLC circuit arrangement.

8. The power supply of claim 1, wherein only the fifth switch is coupled across the second switch and the third switch.

9. The power supply of claim 1, wherein:
the multiple flip-flops include at least two D flip-flops coupled to divide a frequency output by the VCO in half; and
first and second pairs of the multiple logic gates are coupled to a first one of the D flip-flops to generate a fifty percent duty cycle for controlling the at least four switches coupled in the three-level LLC circuit arrangement.

10. The power supply of claim 9, wherein:
fifth and sixth ones of the multiple logic gates are coupled to the second one of the D flip-flops to generate a twenty-five percent duty cycle; and
a seventh one of the multiple logic gates comprises an OR gate coupled to receive the output of the fifth and sixth gates to control the fifth switch.

11. The power supply of claim 1, wherein the control circuit is coupled to:
turn on and turn off the first and third switches at the same time;
turn on and turn off the second and fourth switches at the same time;
turn on the fifth switch while the four switches are turned off; and
turn off the fifth switch while the four switches are turned on.

12. A switch-mode power supply, comprising:
a pair of input terminals for receiving an alternating current (AC) or direct current (DC) voltage input from an input power source;
a pair of output terminals for supplying a direct current (DC) voltage output to a load;
a circuit ground;
at least four switches coupled in a three-level LLC circuit arrangement between the pair of input terminals and the pair of output terminals, with first and second ones of the at least four switches defining a first half-bridge and third and fourth ones of the at least four switches defining a second half-bridge, the first half-bridge coupled between the circuit ground and a first one of the pair of input terminals, and the second half-bridge coupled between the circuit ground and a second one of the pair of input terminals; and
a fifth switch coupled across the second switch and the third switch to short circuit the second switch and the third switch when the fifth switch is closed.

13. The power supply of claim 12, further comprising a transformer and multiple secondary switches, wherein the at least four switches of the three-level LLC circuit arrangement are coupled with a primary side of the transformer and the multiple secondary switches are coupled with a secondary side of the transformer.

14. The power supply of claim 12, further comprising:
a first capacitor and a first inductor coupled between the primary side of the transformer and the first half-bridge; and
a second capacitor and a second inductor coupled between the primary side of the transformer and the second half-bridge.

15. The power supply of claim 12, further comprising:
first and second capacitors, with the first capacitor coupled between the circuit ground and the first input terminal, and the second capacitor coupled between the circuit ground and the second input terminal; and
first and second resistors, with the first resistor coupled between the circuit ground and the first input terminal, and the second resistor coupled between the circuit ground and the second input terminal.

16. The power supply of claim 12, wherein only the fifth switch is coupled across the second switch and the third switch.

17. A switch-mode power supply, comprising:
a pair of input terminals for receiving an alternating current (AC) or direct current (DC) voltage input from an input power source;
a pair of output terminals for supplying a direct current (DC) voltage output to a load;
a transformer having a primary side and a secondary side;
at least four switches coupled in a three-level LLC circuit arrangement between the pair of input terminals and the primary side of the transformer, with a fifth switch coupled across two of the at least four switches coupled in the three-level LLC circuit arrangement to short said two switches when the fifth switch is closed; and
a control circuit including a voltage-controlled oscillator (VCO) and multiple logic gates and flip-flops coupled to operate the five switches.

18. The power supply of claim 17, wherein the control circuit further includes a compensator, a phase comparator and a delay circuit coupled to provide a dead time to achieve zero voltage switching (ZVS) of the at least four switches coupled in the three-level LLC circuit arrangement.

19. The power supply of claim 17, wherein:
the multiple flip-flops include at least two D flip-flops coupled to divide a frequency output by the VCO in half; and
first and second pairs of the multiple logic gates are coupled to a first one of the D flip-flops to generate a fifty percent duty cycle for controlling the at least four switches coupled in the three-level LLC circuit arrangement.

20. The power supply of claim 19, wherein:
fifth and sixth ones of the multiple logic gates are coupled to the second one of the D flip-flops to generate a twenty-five percent duty cycle; and
a seventh one of the multiple logic gates comprises an OR gate coupled to receive the output of the fifth and sixth gates to control the fifth switch.

* * * * *